(12) United States Patent
Byrd

(10) Patent No.: US 8,342,917 B2
(45) Date of Patent: Jan. 1, 2013

(54) FISH SCALING ASSEMBLY

(76) Inventor: John E. Byrd, Minden, LA (US)

( * ) Notice: Subject to any disclaimer, the term of this patent is extended or adjusted under 35 U.S.C. 154(b) by 0 days.

(21) Appl. No.: 12/931,201

(22) Filed: Jan. 26, 2011

(65) Prior Publication Data

US 2012/0190283 A1   Jul. 26, 2012

(51) Int. Cl.
*A22C 25/02* (2006.01)
(52) U.S. Cl. ........................................................ 452/105
(58) Field of Classification Search .............. 30/123, 30/123.5, 123.6, 123.7, 136, 142, 146–148, 30/166.3, 272, 22.1, 277.4, 296.1, 298, 298.4, 30/286, 369–374, 501–503, 503.5, 762
See application file for complete search history.

(56) References Cited

U.S. PATENT DOCUMENTS

| | | | |
|---|---|---|---|
| 3,048,884 A * | 8/1962 | Robichaux | 452/105 |
| 3,270,368 A | 9/1966 | Cook, Sr. et al | |
| 3,670,364 A | 6/1972 | Bradley | |
| 3,835,504 A | 9/1974 | Tripodi | |
| 4,348,807 A * | 9/1982 | Ashdown et al. | 30/123.6 |
| 4,432,117 A | 2/1984 | Iskiw | |
| 4,490,885 A | 1/1985 | Iskiw et al. | |
| 4,592,142 A * | 6/1986 | Schnizler | 30/210 |

* cited by examiner

*Primary Examiner* — Richard Price, Jr.
(74) *Attorney, Agent, or Firm* — R. Keith Harrison

(57) ABSTRACT

A fish scaling assembly includes at least one assembly blade adapted for engagement and reciprocation by the electric knife handle and a generally wedge-shaped scale removing member carried by the at least one assembly blade.

16 Claims, 4 Drawing Sheets

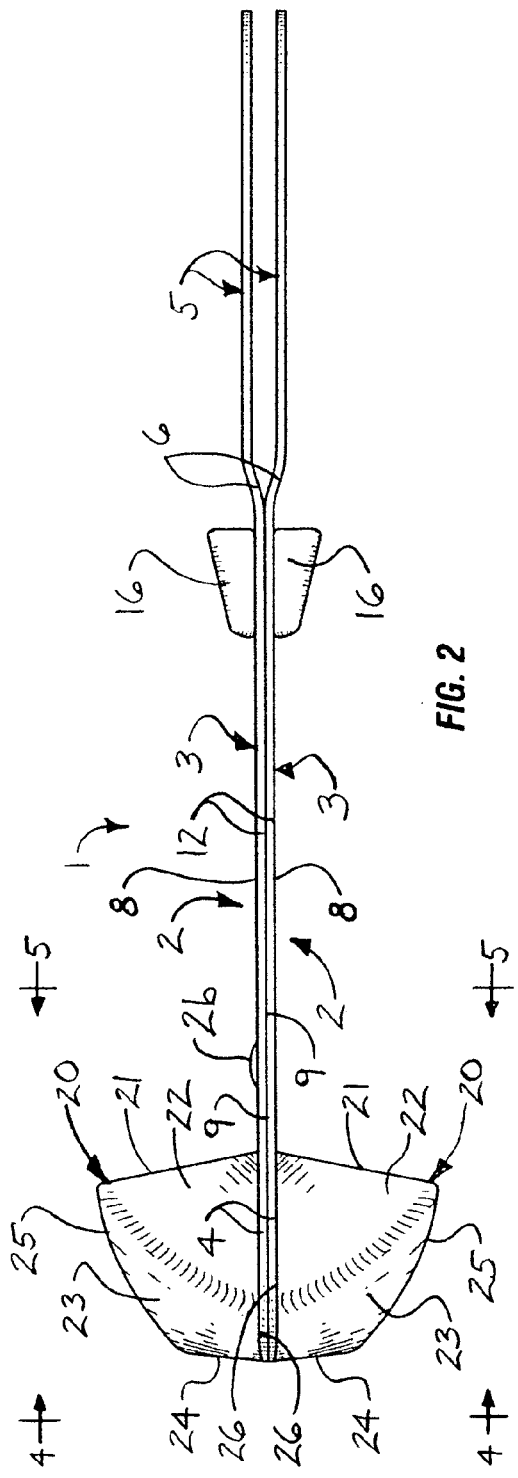
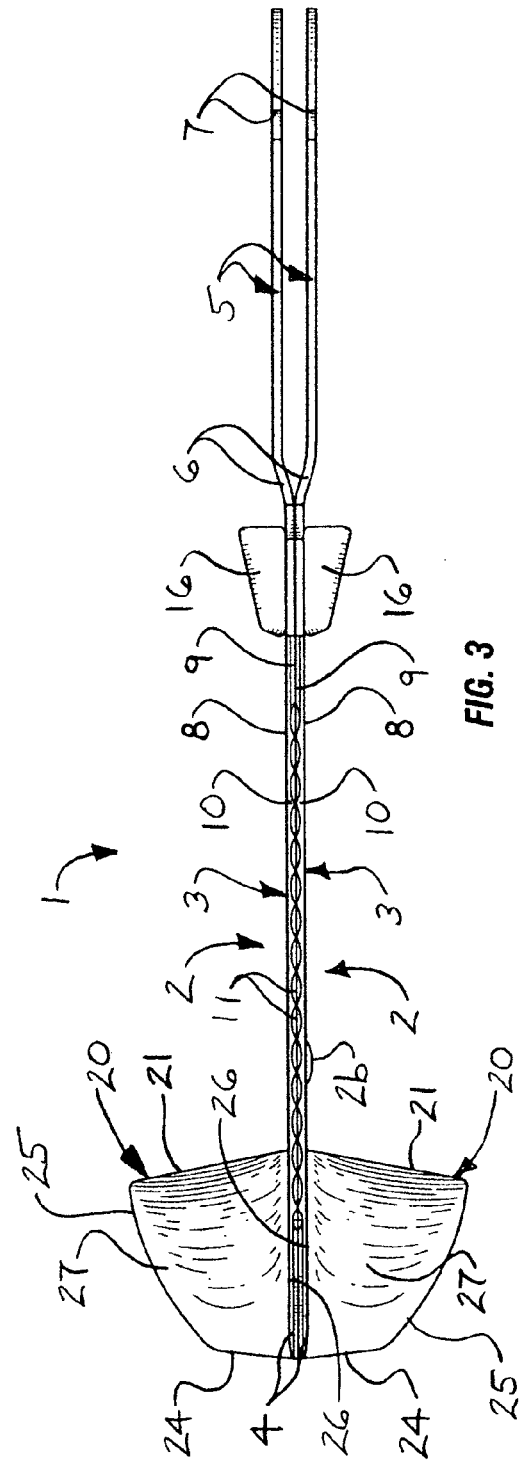

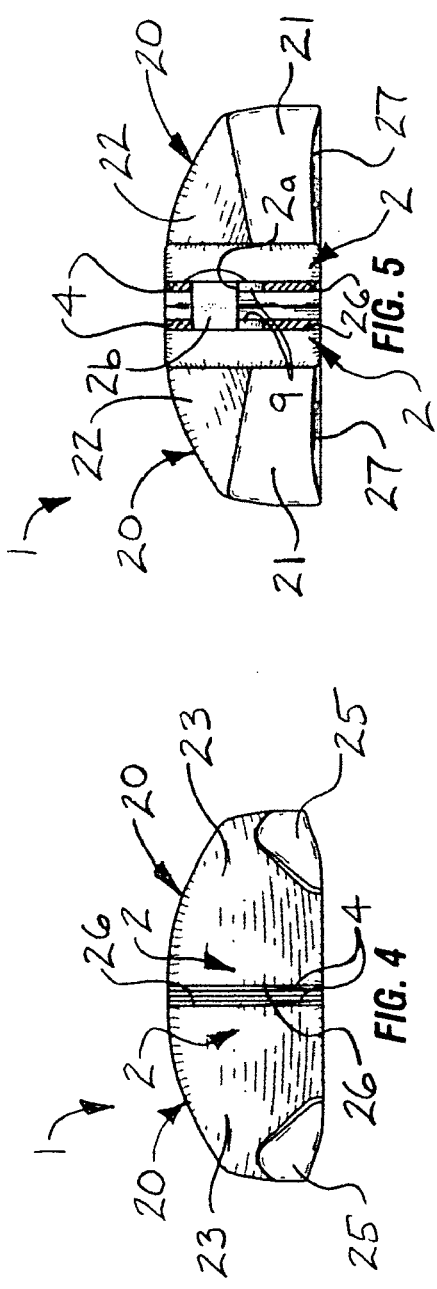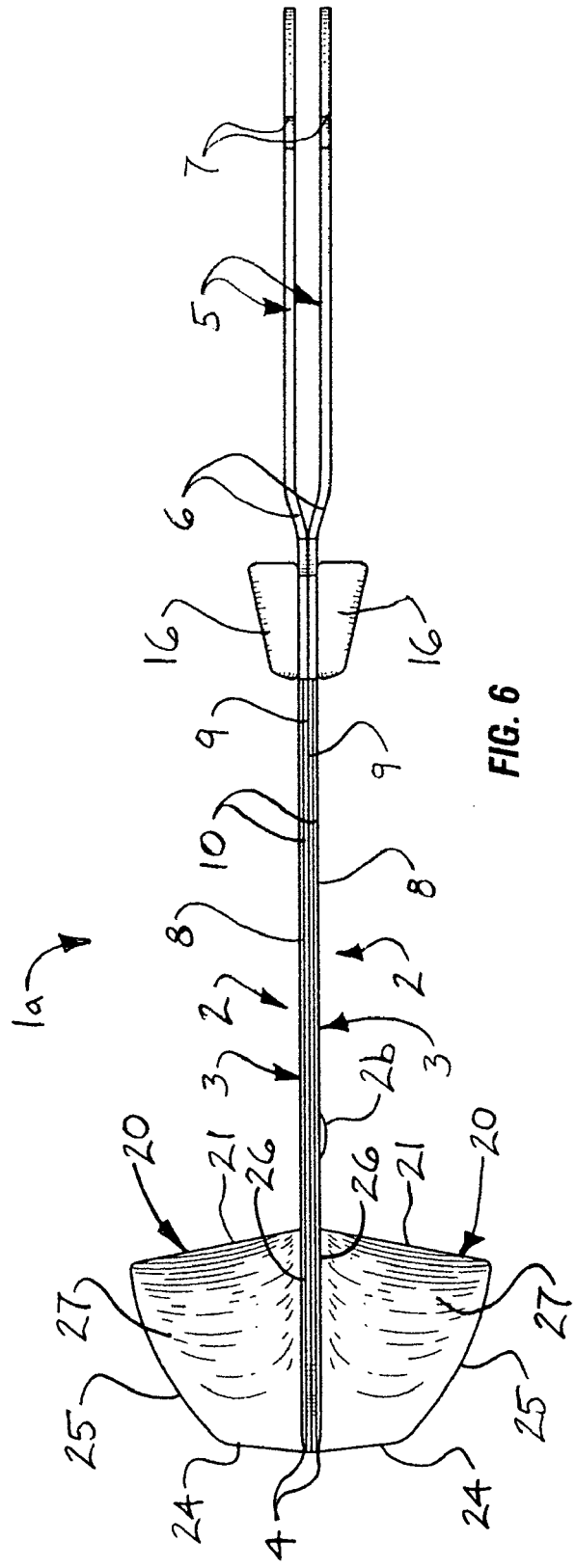

FISH SCALING ASSEMBLY

FIELD

The disclosure generally relates to devices for scaling fish. More particularly, the disclosure relates to a fish scaling assembly having at least one scale removing member which can be actuated by operation of an electric knife handle to remove scales from a fish.

BACKGROUND

Fish cleaning involves removing the skin, bones and entrails from the edible meat portions of a fish preparatory to freezing or cooking the meat for ultimate consumption. The fish cleaning operation is commonly accomplished using an electric knife (also known as a "fillet knife"). A conventional electric knife includes a trigger-, button- or switch-operated electric knife handle having at least one blade slot which receives at least one typically serrated cutting blade. A blade reciprocating mechanism inside the knife handle engages the cutting blade or blades and facilitates reciprocation of the blade or blades typically as the trigger, button or switch on the knife handle is depressed or otherwise manipulated. Accordingly, each reciprocating cutting blade cuts the fish open for removal of the entrails as well as to remove the skin from the meat and the meat from the bones of the fish during cleaning.

Prior to cleaning a fish, it may be necessary or desirable to remove scales from the skin of the fish. A fish may be scaled using a conventional manual fish scaling tool, which may include a shaft or handle fitted with a curved blade. The shaft or handle is gripped and repeatedly moved in a back-and-forth motion as the blade is pressed against the scales such that the blade cuts or dislodges the scales from the skin of the fish. Prior to the cleaning operation, the loose scales may be washed from the skin of the fish.

One of the drawbacks associated with conventional manual fish scaling tools is that the tools are laborious to use, particularly if numerous fish require scaling and cleaning during the cleaning operation. Scales which should be removed from the fish are often missed during scaling. Moreover, the manual fish scaling tool and the electric knife which is typically used to clean the fish are separate devices, requiring that the user keep track of two devices during the fish scaling and cleaning operation. Accordingly, a fish scaling assembly having at least one scale removing member which can be actuated using an electric knife handle is needed.

SUMMARY

The disclosure is generally directed to a fish scaling assembly for use with an electric knife handle. The fish scaling assembly can be actuated using the electric knife handle to remove scales from a fish. An illustrative embodiment of the fish scaling assembly includes at least one assembly blade adapted for engagement and reciprocation by the electric knife handle and a generally wedge-shaped scale removing member carried by the at least one assembly blade.

BRIEF DESCRIPTION OF THE DRAWINGS

The disclosure will now be made, by way of example, with reference to the accompanying drawings, in which:

FIG. 2 is a top view of the fish scaling assembly illustrated in FIG. 1, detached from the electric knife handle (not illustrated);

FIG. 3 is a bottom view of the fish scaling assembly detached from the electric knife handle;

FIG. 4 is a front view of the fish scaling assembly, taken along viewing lines 4-4 in FIG. 2;

FIG. 5 is a sectional view of the fish scaling assembly, taken along section lines 5-5 in FIG. 2;

FIG. 6 is a bottom view of an alternative illustrative embodiment of the fish scaling assembly.

DETAILED DESCRIPTION

Figure 1:
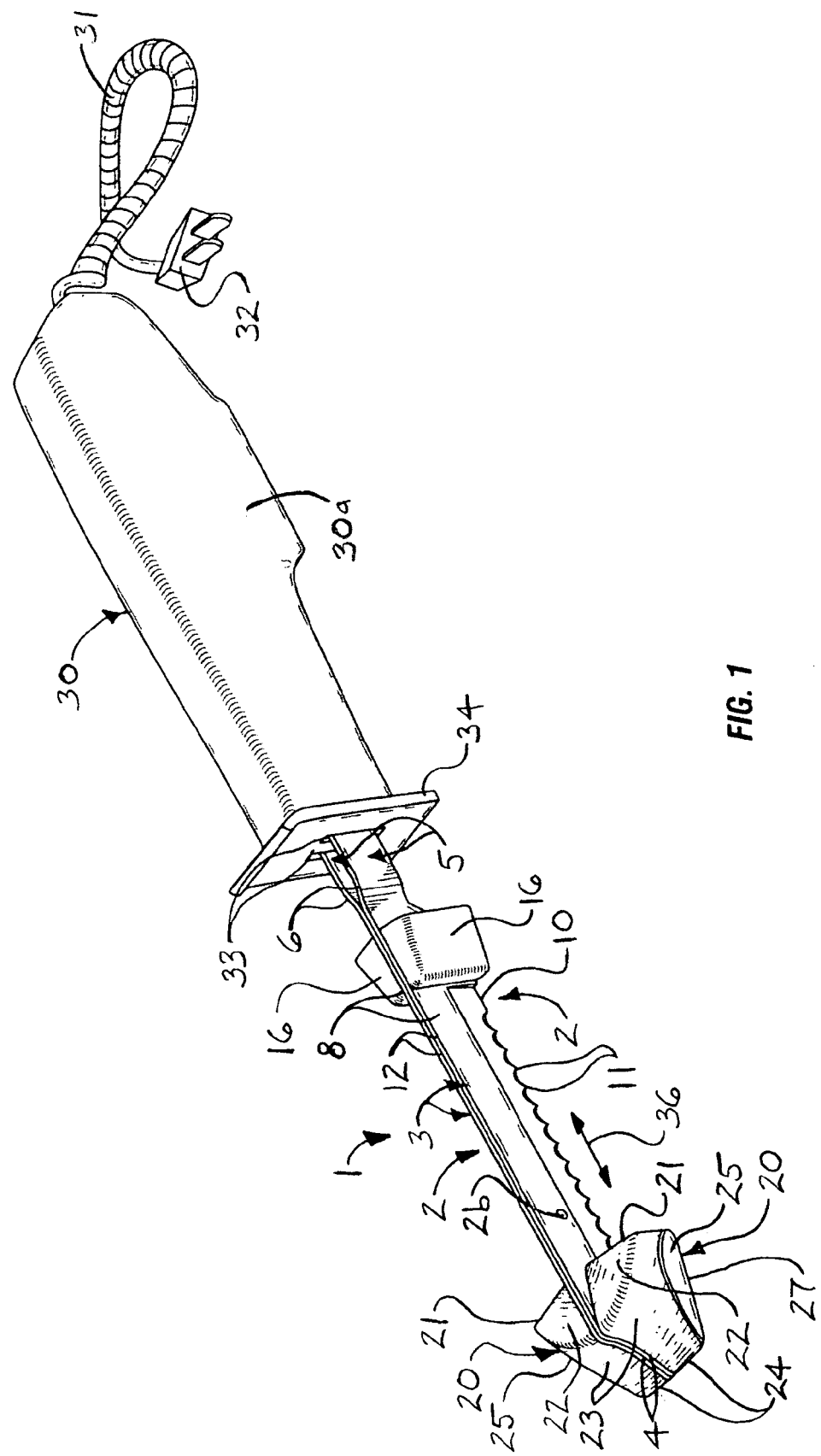
FIG. 1 is a perspective view of an illustrative embodiment of the fish scaling assembly, engaged for reciprocation by an electric knife handle.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. Relative terms herein, such as "upper", "lower", "front" and "rear", are used with reference to relative positions of various elements with respect to each other in exemplary application of the fish scaling assembly and are not intended to be used in a limiting sense.

Referring to the drawings, an illustrative embodiment of the fish scaling assembly, hereinafter assembly, is generally indicated by reference numeral 1. The assembly 1 includes at least one assembly blade 2 each of which may be stainless steel or other suitable material. Each assembly blade 2 may include a generally elongated main blade segment 3 having a forward segment end 4 and a handle insertion segment 5 which extends rearwardly from the main blade segment 3. In some embodiments, the handle insertion segment 5 may extend from a blade bevel 6 which protrudes outwardly and rearwardly from the main blade segment 3.

Figure 7:
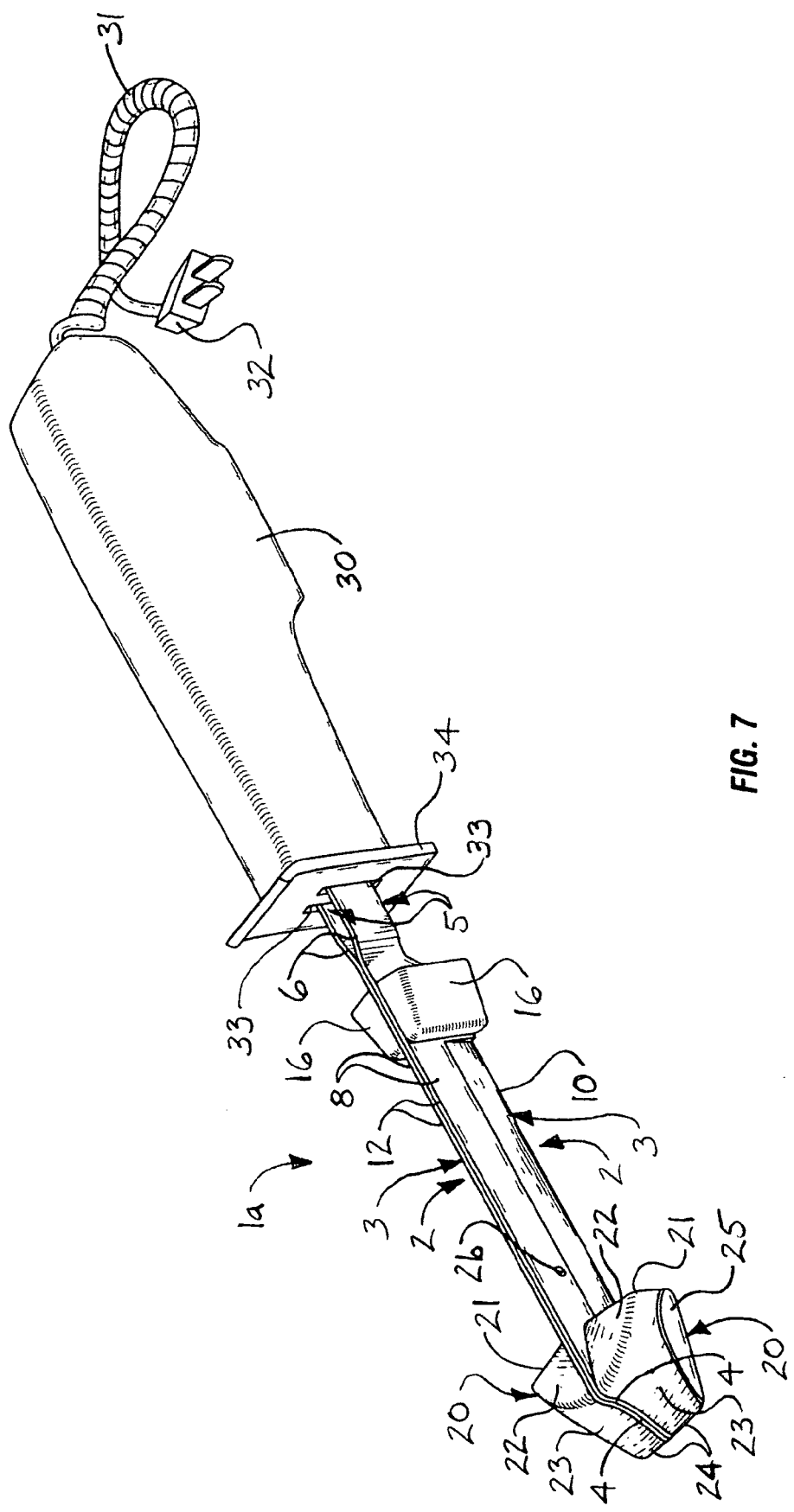
FIG. 7 is a perspective view of the alternative illustrative embodiment of the fish scaling assembly illustrated in FIG. 6, engaged for reciprocation by an electric knife handle.

The main blade segment 3 and the handle insertion segment 5 of each assembly blade 2 may have an outer blade surface 8, an inner blade surface 9 (FIG. 2), a lower blade edge 10 and an upper blade edge 12. As illustrated in FIGS. 1 and 3, in some embodiments of the assembly 1, multiple blade serrations 11 may be provided in the lower blade edge 10 of the main blade segment 3 of at least one assembly blade 2. As illustrated in FIGS. 6 and 7, in other embodiments of the assembly 1a, the blade serrations 11 may be omitted from the lower blade edge 10 of the main blade segment 3 of at least one assembly blade 2. As illustrated in FIG. 3, a blade notch 7 may be provided in the lower blade edge 10 of each assembly blade 2 at the handle insertion segment 5 for purposes which will be hereinafter described. A blade stop 16 may be provided on the outer blade surface 8 of the main blade segment 3 of each assembly blade 2 as is known by those skilled in the art.

In some embodiments, the assembly 1 may include a pair of generally parallel, adjacent assembly blades 2, as illustrated. Accordingly, as illustrated in FIG. 5, a generally elongated blade alignment pin slot 2a may be provided in one assembly blade 2. A blade alignment pin 2b may extend from the inner blade surface 9 of the adjacent assembly blade 2. The blade alignment pin 2b may be inserted in the registering blade alignment pin slot 2a to secure the assembly blades 2 in adjacent relationship to each other. In some embodiments, the blade alignment pin 2b may be selectively removed from the blade alignment pin slot 2a to detach the assembly blades 2 from each other.

A scale removing member 20 may be provided at the segment end 4 of the assembly blade 2. The scale removing member 20 may be metal, plastic or other rigid material. The scale removing member 20 may be generally wedge-shaped with a generally flat or planar inner surface 26 (FIGS. 2 and 3) which may be attached to the outer blade surface 8 of the corresponding assembly blade 2 at the segment end 4 using fasteners (not illustrated), adhesives (not illustrated) and/or any other suitable attachment technique which is known by those skilled in the art. Each scale removing member 20 may further include an outer surface 25 which is spaced-apart from the inner surface 26. The outer surface 25 may be generally curved or convex when viewed in top view (FIG. 2) and in bottom view (FIG. 3). A lower surface 27 (FIG. 3) may extend between the outer surface 25 and the inner surface 26. As illustrated in FIG. 1, a generally sloped front surface 23 may extend at an acute angle with respect to the lower surface 27. A scale removing edge 24 may demarcate the front surface 23 from the lower surface 27. As further illustrated in FIG. 1, the segment end 4 of the assembly blade 2 may be shaped to generally conform to the configuration of the front surface 23 of the scale removing member 20. An upper surface 22 may extend rearwardly from the front surface 23 of the scale removing member 20. A rear surface 21 may extend between the lower surface 27 and the upper surface 22 and between the outer surface 25 and the inner surface 26. As illustrated in FIGS. 2 and 3, the scale removing members 20 on the adjacent assembly blades 2 may be generally matching or symmetrical on respective sides of the assembly blades 2.

In exemplary application, the assembly 1 is used with an electric fillet knife handle 30 (FIG. 1) to remove scales (not illustrated) from the skin of a fish (not illustrated) typically preparatory to cleaning the fish. The electric fillet knife handle 30 may be conventional and typically includes a knife handle housing 30a which contains an electrical blade reciprocating mechanism (not illustrated). In some applications, the electric fillet knife handle 30 may include an electrical knife cord 31 having a plug 32 and electrically connected to the blade reciprocating mechanism in the knife handle housing 30a. The plug 32 on the knife cord 31 may be adapted for insertion into a standard 120-volt household electrical outlet (not illustrated). In other embodiments, the electric fillet knife handle 30 may be battery-operated. A trigger, button or switch (not illustrated) may be provided on the knife handle housing 30a and connected to the blade reciprocating mechanism in the knife handle housing 30a. At least one blade slot 33 in the front end of the electric fillet knife handle 30 is sized and configured to receive the correspondingly-sized and configured handle insertion segment 5 of each assembly blade 2 of the assembly 1. A finger guard 34 may be provided on the knife handle housing 30a at the blade slots 33 in the conventional manner.

An exemplary conventional reciprocating mechanism in the electric fillet knife handle 30 includes an electric motor (not illustrated) which drivingly engages a worm gear (not illustrated). The worm gear reciprocates the assembly 1, inserted in the blade slot or slots 33 in the electric fillet knife handle 30, responsive to operation of the electric motor. For optimal operation and scaling efficiency of the assembly 1, the electric fillet knife handle 30 has an operating RPM of at least 2800. The assembly 1 is particularly adaptable for use with a model no. MT-1201 (Twister Electric Fisherman) and a model no. MT-1208 (Twister Saltwater Piranha) electric fillet knife handle, each of which is available from the MISTER TWISTER® Corp. of Minden, La. and has an operating RPM of from about 2800 to about 3300. The operating RPM of the electric fillet knife handle 30 may vary depending on the magnitude of pressure which is applied to the electric fillet knife handle 30 during the scaling operation.

As illustrated in FIG. 5, in some applications, the blade alignment pin 2b on one assembly blade 2 may be inserted into the registering blade alignment pin opening 2a in the adjacent assembly blade 2. Upon insertion of the handle insertion segments 5 of the assembly blades 2 into the respective blade slots 33 in the electric fillet knife handle 30, the blade reciprocating mechanism in the knife handle housing 30a of the electric fillet knife handle 30 engages the blade notches 7 (FIG. 3) in the handle insertion segments 5 of the respective assembly blades 2. Accordingly, after insertion of the plug 32 on the knife cord 31 into the electrical outlet (or placement of batteries in a battery compartment contained in the knife handle housing 30a), the trigger, button or switch on the knife handle housing 30a may be depressed or otherwise manipulated to establish flow of current from the knife cord 31 or batteries to the blade reciprocating mechanism. The blade reciprocating mechanism reciprocates the assembly blades 2 in tandem in the respective blade slots 33 in the electric fillet knife handle 30, as indicated by the arrow 36 in FIG. 1. As the scale removing members 20 of the reciprocating assembly blades 2 are applied to the scales (not illustrated) of a fish, the scale removing edge 24 on each scale removing member 20 cuts or dislodges and removes the scales from the skin of the fish. As the scale removing members 20 move forwardly, the cut or dislodged scales are pushed onto the angled or sloped front surface 23 of the scale removing member 20. Loose and dislodged scales can be removed from the scale removing members 20 and from the skin of the fish (not illustrated) by rinsing the scale removing members 20 and the fish in water (not illustrated). After use, the assembly blade or blades 2 of the assembly 1 may be removed from the blade slot or slots 33 in the electric fillet knife handle 30 for washing and preparation of subsequent use.

In some applications, the assembly 1 having the blade serrations 11 on at least one of the assembly blades 2 may be additionally used to clean the scaled fish (not illustrated) typically after scaling of the fish as was heretofore described. Accordingly, as the assembly blades 2 are reciprocated by operation of the electric fillet knife handle 30, the blade serrations 11 are applied to the fish to cut the fish open for removal of the entrails as well as to remove the skin from the meat and the meat from the bones of the fish.

It will be appreciated by those skilled in the art that the assembly 1 enhances and expedites removal of scales from fish without the laborious and time-consuming practice of manually reciprocating a conventional fish scaling tool against the fish for the purpose. This expedient is particularly desirable under circumstances in which a large number of fish are to be scaled prior to cleaning of the fish. Moreover, in embodiments in which one or both of the assembly blades 2 includes the blade serrations 11, as was heretofore described with respect to the assembly 1 in FIGS. 1 and 3, the assembly 1 may additionally be used to clean the fish after the fish have been scaled by actuation of the scale removing member or members 20. Therefore, the combined features of the scale removing member or members 20 with the blade serrations 11 in the assembly blade or blades 2 of the assembly 1 eliminates the need to keep track of both a conventional manual fish scaling tool and an electric fillet knife for scaling and cleaning of the fish, respectively.

While illustrative embodiments of the disclosure have been described above, it will be recognized and understood that various modifications can be made in the disclosure and the appended claims are intended to cover all such modifications which may fall within the spirit and scope of the disclosure.

What is claimed is:

1. A fish scaling assembly for use with an electric knife handle, comprising:
    at least one assembly blade adapted for engagement and reciprocation by the electric knife handle, said at least one assembly blade including a main blade segment having a segment end, a blade bevel extending from said main blade segment and a handle insertion segment extending from said blade bevel; and
    a generally wedge-shaped scale removing member carried by said at least one assembly blade.

2. The fish scaling assembly of claim 1 further comprising a plurality of serrations on said at least one assembly blade.

3. The fish scaling assembly of claim 1 wherein said scale removing member comprises a lower surface, a front surface disposed at an acute angle with respect to said lower surface and a scale removing edge demarcating said front surface from said lower surface.

4. The fish scaling assembly of claim 3 wherein said scale removing member further comprises an upper surface extending rearwardly from said front surface.

5. The fish scaling assembly of claim 4 wherein said scale removing member further comprises a rear surface extending between said lower surface and said upper surface.

6. The fish scaling assembly of claim 5 wherein said scale removing member further comprises an inner surface extending between said lower surface and said upper surface and carried by said at least one assembly blade.

7. A fish scaling assembly for use with an electric knife handle, comprising:
    a pair of elongated, adjacent assembly blades adapted for engagemen: and reciprocation by the electric knife handle, each of said assembly blades including a main blade segment having a segment end, a blade bevel extending from said main blade segment and a handle insertion segment extending from said blade bevel; and
    a pair of generally matching, symmetrical, wedge-shaped scale removing members carried by said assembly blades, respectively.

8. The fish scaling assembly of claim 7 further comprising a plurality of serrations on at least one of said assembly blades.

9. The fish scaling assembly of claim 7 wherein each of said scale removing members comprises a lower surface, a front surface disposed at an acute angle with respect to said lower surface and a scale removing edge demarcating said front surface from said lower surface.

10. The fish scaling assembly of claim 9 wherein each of said scale removing members further comprises an upper surface extending rearwardly from said front surface.

11. The fish scaling assembly of claim 10 wherein each of said scale removing members further comprises a rear surface extending between said lower surface and said upper surface.

12. The fish scaling assembly of claim 11 wherein each of said scale removing members further comprises an inner surface extending between said lower surface and said upper surface and carried by said at least one assembly blade.

13. A fish scaling assembly for use with an electric knife handle, comprising:
    a pair of generally elongated, parallel, adjacent assembly blades each including:
        a main blade segment having a segment end and a handle insertion segment extending from said main blade segment and adapted for engagement and reciprocation by the electric knife handle; and
    a pair of generally matching, symmetrical, wedge-shaped scale removing members carried by said assembly blades, respectively and each including:
        an inner surface carried by a corresponding one of said assembly blades;
        a generally convex, curved outer surface spaced-apart from said inner surface;
        a lower surface extending between said inner surface and said outer surface;
        a front surface extending between said inner surface and said outer surface and disposed at an acute angle with respect to said lower surface;
        a scale removing edge demarcating said front surface from said lower surface;
        an upper surface extending rearwardly from said front surface; and
        a rear surface extending between said lower surface and said upper surface and between said inner surface and said outer surface.

14. The fish scaling assembly of claim 13 wherein each of said assembly blades comprises an outer blade surface, an inner blade surface, a lower blade edge and an upper blade edge and wherein a corresponding one of said scale removing members is carried by said outer blade surface of a corresponding one of said assembly blades.

15. The fish scaling assembly of claim 14 further comprising at least one blade notch in said lower blade edge.

16. The fish scaling assembly of claim 13 further comprising a plurality of blade serrations in said main blade segment of each of said assembly blades.

* * * * *